(12) United States Patent
Ross

(10) Patent No.: US 6,599,069 B2
(45) Date of Patent: Jul. 29, 2003

(54) CARGO HANDLING APPARATUS

(76) Inventor: Ralph Barclay Ross, Pitmedden Road, Dyce, Aberdeen, AB21 0DP (GB)

( * ) Notice: Subject to any disclaimer, the term of this patent is extended or adjusted under 35 U.S.C. 154(b) by 0 days.

(21) Appl. No.: 09/911,101

(22) Filed: Jul. 23, 2001

(65) Prior Publication Data

US 2002/0054804 A1 May 9, 2002

(30) Foreign Application Priority Data

Jul. 22, 2000 (GB) .............................................. 0017969

(51) Int. Cl.[7] .................................................. B60P 7/08
(52) U.S. Cl. .............................. 410/36; 410/34; 410/35; 410/42
(58) Field of Search .............................. 410/31, 32, 34, 410/35, 36, 37, 38, 42; 206/443, 446; 248/68.1; 211/70.4

(56) References Cited

U.S. PATENT DOCUMENTS

| 710,639 | A | * | 10/1902 | Vickers | 410/38 |
|---|---|---|---|---|---|
| 1,245,607 | A | * | 11/1917 | Maxwell | 410/38 |
| 1,342,654 | A | * | 6/1920 | Torgerson | 410/37 |
| 1,940,186 | A | * | 12/1933 | Romine | 410/38 |
| 2,248,119 | A | * | 7/1941 | Reed et al. | 410/35 |
| 3,204,983 | A | * | 9/1965 | Rehnstrom et al. | 410/37 |
| 5,123,547 | A | | 6/1992 | Koch | |
| 5,964,557 | A | | 10/1999 | Eng | |
| 5,967,718 | A | * | 10/1999 | Hoh et al. | 410/99 |
| 6,146,068 | A | * | 11/2000 | Schroeder | 410/35 |
| 6,261,037 | B1 | * | 7/2001 | Richards et al. | 410/36 |

FOREIGN PATENT DOCUMENTS

| EP | 0 462 086 A1 | 12/1991 |
|---|---|---|
| GB | 2 165 204 A | 4/1986 |
| SU | 1237573 A | 1/1986 |
| WO | WO 00/43295 | 7/2000 |

* cited by examiner

Primary Examiner—Stephen T. Gordon
(74) Attorney, Agent, or Firm—Gifford, Krass, Groh, Sprinkle, Anderson & Citkowski, P.C.

(57) ABSTRACT

A retaining member 16 is provided for use with a frame 10 for packaging elongate members, such as sections of drill pipe. The retaining member 16 comprises a pressure plate 18 on which is mounted a pair of pivoting hooks 20 for engaging with protrusions 36 formed on the frame 10. The hooks 20 are connected to threaded rods 28 received in a sleeve 30. A ratcheted handle 34 allows selective rotation of the sleeve 30 to draw the rods 28 therein, and so to pivot the hooks 20 to urge the pressure plate 18 against members received within the frame 10. A quick release mechanism is provided to allow easy release of the hooks 20 and the retaining member 16.

14 Claims, 4 Drawing Sheets

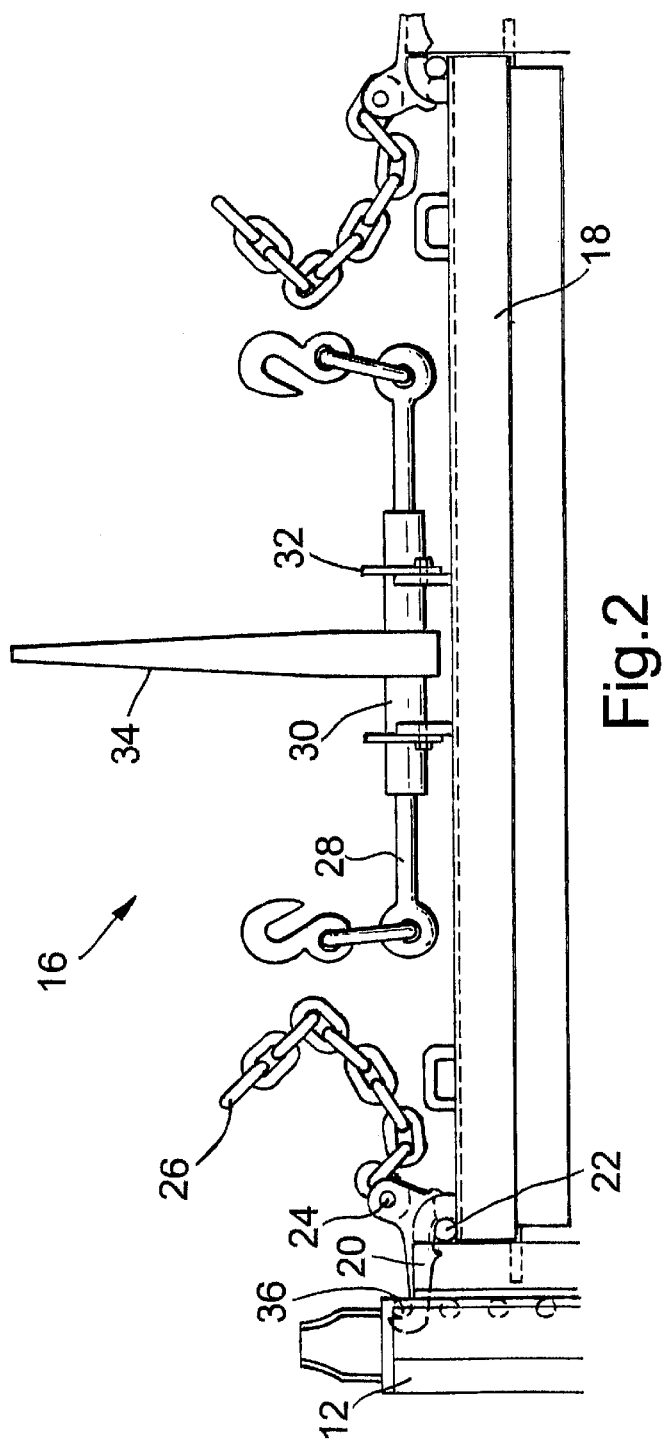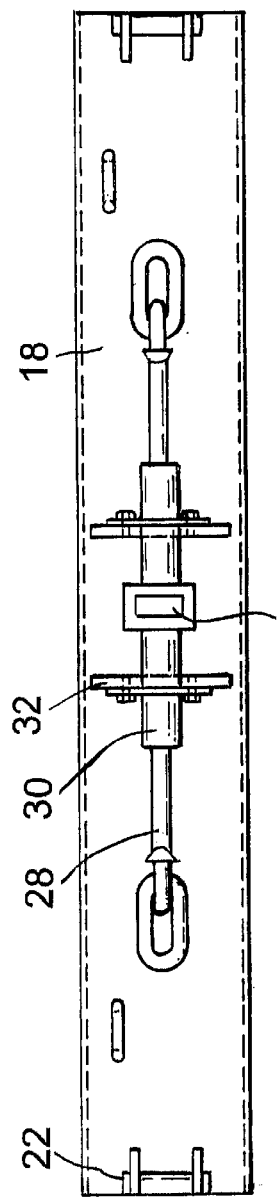

CARGO HANDLING APPARATUS

The present invention relates to cargo handling apparatus, particularly apparatus for packaging elongate members. Aspects of the invention further relate to a retaining member for use in such an apparatus, for retaining elongate members in a packaged state.

Drilling boreholes by rotary drilling usually involves use of a drill string with a drill bit at the distal end, and a motor at the rig end. The drill string is conventionally made up of many drillpipe sections which are connected together by threaded box and pin connections. The drillpipe sections are typically 9.5–13.1 meters long, are relatively heavy, and require careful handling.

For storing and transporting drillpipe and other tubulars it is known to stack tubular lengths in cuboid bundles. The bundles are formed using perhaps four U-frames, with spacers being located between the arms of the U-frames and having upper and lower faces profiled to cooperate with tubular lengths of a particular diameter. The U-frames are spaced along the bundle and the bundle is lifted by slings or the like coupled to the U-frames. Accordingly, the spacers must be selected to suit the particular drillpipe dimensions, such that it is necessary for drillpipe suppliers and shippers to retain an extensive inventory of spacers.

An improved drillpipe packaging apparatus has been developed, and is described in International Patent Application PCT/GB00/00176. This improved apparatus comprises a pair of U-frames connected by spacers, on which are located deformable elastomeric packing members. In use, the elongate members to be packed are separated by the deformable members, which will deform to grip the elongate members securely. As the packaging members are deformable, the members may be used to package a variety of sizes of drillpipes, so obviating the need for suppliers and shippers to retain a range of packaging members. In order to bring about secure engagement of the drillpipes and packaging members, the apparatus further comprises a retaining arrangement to urge the stack of drillpipes and packaging members together. However, currently-known retaining arrangements are often unwieldy and may be difficult to fix correctly; further, existing retaining arrangements do not avoid the possibility that pressure may be applied unevenly to the stack of drillpipes, as a retaining arrangement on each side of each U-frame must be adjusted by hand separately.

It is among the objects of embodiments of the present invention to obviate or alleviate these and other disadvantages of the prior art.

According to a first aspect of the present invention, there is provided apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, the retaining means comprising a pressure plate for urging the elongate members into contact with the packing member, engaging means for engaging a portion of the frame, and an adjustable tension member connected to the engaging means, the engaging means being mounted on a pivot on the pressure plate such that an increase in the tension applied by the tension member causes the engaging means to pivot and be urged against said portion of the frame.

Thus, the present invention enables a compression force to be applied to the packaged elongate members by adjustment of the tension member, which causes the pressure plate to be urged against the frame.

Preferably the pressure plate is provided with two ends, and an engaging means is located at each end of the pressure plate. This enables pressure to be applied over the length of the pressure plate, and hence more evenly across the elongate members. Each engaging means may be connected to a separate tension member; although preferably a common tension member is used. This ensures that equal tension may be exerted on each of the engaging means. In those embodiments in which separate tension members are provided, the tension members may nonetheless preferably be operatively associated such that adjustment of a single tension member causes adjustment of the remaining tension members to the same degree.

The tension member may for example comprise a chain, wire, cable, bar, rod, rope, and the like. The tension member may comprise a plurality of members. Each member may for example be connected to a separate engaging means. Preferably a pair of oppositely-oriented members are provided.

Preferably the tension member comprises a member movably received in a sleeve. Adjustment of the tension member may thus be effected by moving the member within the sleeve. Either the member or the sleeve may be connected to the engaging means, although preferably the member is so connected.

Preferably, the member and the sleeve comprise interacting male and female threads, such that relative rotation of the member and sleeve causes relative axial movement of the member and the sleeve. Conveniently the apparatus further comprises a handle for turning one of the sleeve and member, the handle incorporating a ratchet arrangement, such that the handle may only engage to turn the sleeve or the member in one direction. Thus, the handle may be used to increase the tension exerted by the tension member in order to apply pressure to the elongate members. Conveniently also a release mechanism is provided on the apparatus, to allow turning of the sleeve or the member in the other direction, to loosen the tension member. For example, a reversible ratchet arrangement may be provided.

Other embodiments of the invention may also incorporate alternative one-way ratchet mechanisms (for example, a winding may be arranged to turn only one way to allow tightening of a cable, or the like). Certain embodiments may also incorporate a quick-release mechanism, to rapidly release the tension in the tension members.

Preferably the engaging means comprises a hook. The hook may be single or paired, depending on the nature of the portion of the frame which is engaged. Other suitable engaging means include plates, levers, clamps, clasps, locks, chains, and the like.

The portion of the frame which is engaged may comprise recesses, protrusions, studs, bosses, or the like. In a preferred embodiment, the engaged portion comprises a pair of studs disposed on opposed sides of the frame; and the engaging means comprises a paired hook.

According to a second aspect of the present invention, there is provided apparatus for applying a compression force to a member held within a frame, the apparatus comprising a pressure plate, engaging means for in use engaging a portion of a frame, and an adjustable tension member connected to the engaging means, the engaging means being mounted on a pivot on the pressure plate such that an adjustment in the tension applied by the tension member causes the engaging means to pivot.

Preferably the pressure plate is provided with two ends, and an engaging means is located at each end of the pressure plate.

Preferably the tension member comprises a member movably received in a sleeve. Preferably two members are provided; preferably the members are oppositely-oriented in a sleeve. Preferably the member and the sleeve comprise interacting male and female threads. Preferably the apparatus further comprises a handle for turning one of the sleeve and the member. Preferably also the handle incorporates a ratchet arrangement, such that the handle may only engage to turn the sleeve or the member in one direction. Conveniently a release mechanism is also provided on the apparatus, to allow turning of the sleeve or the member in the other direction.

Preferably the engaging means comprises a hook; more preferably the hook is a paired hook.

According to a yet further aspect of the present invention, there is provided a method of applying a compression force to elongate members held within a frame, the method comprising the steps of:

providing a pressure plate, engaging means mounted on a pivot on the plate, and an adjustable tension member connected to the engaging means;

engaging the engaging means with a portion of a frame; and adjusting the tension member to exert increased tension on the engaging means.

According to a further aspect of the present invention, there is provided an apparatus for applying a compression force to a member held within a frame, the apparatus comprising a pressure plate, at least two engaging means for, in use, engaging respective portions of a frame, and at least two adjustable tension members each connected to a respective engaging means for applying a holding force to the engaging means, the adjustable tension members being operatively associated such that the force exerted on each engaging means by each tension member is substantially equal, and the engaging means being mounted on respective pivots on the pressure plate such that a variation in the force applied by the tension member causes the engaging means to pivot and be urged against a portion of a frame.

According to a yet further aspect of the present invention, there is provided an apparatus for applying a compression force to a member held within a frame, the apparatus comprising a pressure plate, at least two engaging means for, in use, engaging respective portions of a frame, and an adjustable member connected to at least one of the engaging means for applying a force to the engaging means, the engaging means being mounted on respective pivots on the pressure plate such that an adjustment in the force applied by the member causes the engaging means to pivot, and the engaging means being operatively associated with one another and with the member such that the force exerted on each engaging means by the member is substantially equal.

According to a yet further aspect of the present invention there is provided an apparatus for applying a compression force to a member held in a frame, the apparatus comprising a pressure plate, at least two engaging means mounted on the pressure plate and for, in use, engaging respective portions of a frame, and an adjustable member for variably applying a substantially equal force to each engaging means, to urge the engaging means against the respective portion of the frame and so urge the pressure plate against a member held in the frame.

According to a still further aspect of the present invention, there is provided an apparatus for applying a force to a member held in a frame, the apparatus comprising at least two spaced portions for urging against a member, each portion comprising an engagement means for engaging a portion of a frame; the apparatus further comprising variable force means for variably applying a substantially equal force to each engagement means; wherein the engagement means are urged against the portion of the frame to a degree proportionate to the force applied by the force means, each engagement means serving to urge a respective spaced portion against a member.

The spaced portions may be separate, or may be portions of a unitary member; for example, a pressure plate.

These and other aspects of the present invention will now be described by way of example only with reference to the accompanying drawings, in which:

FIG. 2 shows a side view of the retaining means of the apparatus of FIG. 1;

FIG. 3 shows a top view of selected parts of the retaining means of FIG. 2;

Figure 1:
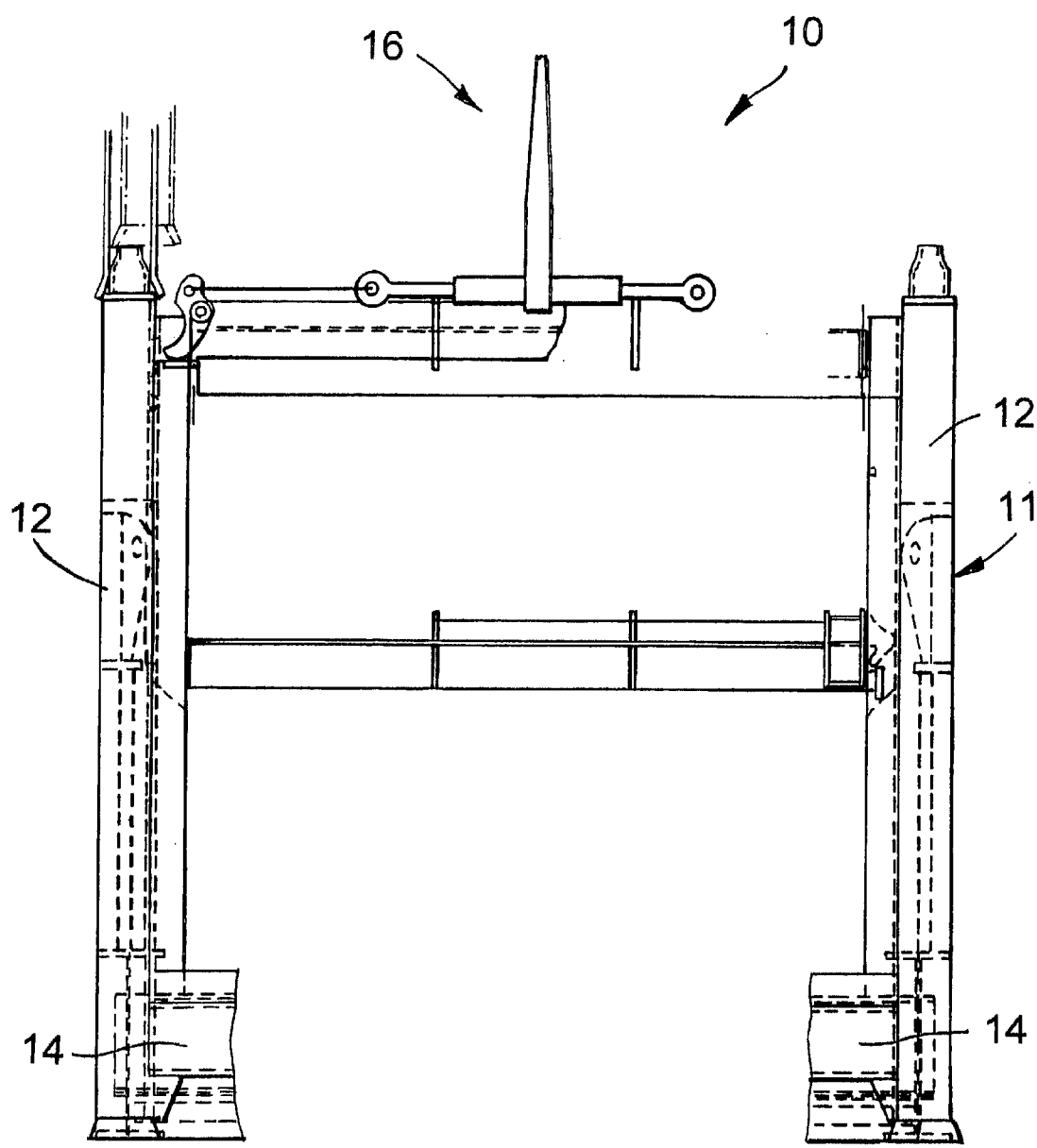
FIG. 1 shows a partial end view of an apparatus for packaging elongate members in accordance with one embodiment of the invention.

Referring first of all to FIG. 1, this shows a partial sketch of an apparatus for packaging elongate members, in accordance with one embodiment of the invention The apparatus 10 includes a pair of U-shaped frame members 11 (only one shown in end view), comprising two upright side portions 12 connected by an elongate base member 14 (only partially shown). Each of the U-shaped frame members has a number of horizontally-extending cross-pieces (not shown) extending between the upright portions of the U-frame 12. Each of the cross-pieces is covered with a profiled cover of a deformable resilient elastomeric compound. In use, sections of drillpipe may be loaded onto the apparatus, with a cross-piece supporting either end of the pipe. The elastomeric compound deforms under the weight of the pipe, to hold the pipe securely in position. A number of layers of pipe may be built up, with elastomer on the lower portions of the cross-pieces engaging the upper surfaces of the lower layers of pipe. Once all layers of pipe have been assembled, a retaining arrangement is tightened to urge the layers of pipes and cross-pieces together. The operation and construction of a similar apparatus, which does not incorporate the retaining arrangement as described herein, is disclosed in International Patent Application PCT\GB00\00176.

The apparatus 10 as illustrated in FIG. 1, however, further includes a retaining arrangement 16, shown only partially in FIG. 1. The retaining arrangement is shown in more detail in FIG. 2, and a plan view of the retaining means is provided in FIG. 3, with several parts omitted for clarity. The retaining arrangement 16 comprises a pressure plate 18 on which is mounted at either end a hook 20 incorporating a pivot pin 22. The hook 20 has a protruding lug 24 which is connected via a chain 26 to a rod 28. The rod 28 is threadably received in a sleeve 30, which is itself rotatably mounted by means of lugs and rings 32 on the pressure plate 18. The sleeve 30 actually receives two oppositely threaded rods 28, one in either end of the sleeve 30, the retaining means 16 being symmetrical about a central axis.

The sleeve 30 is further connected to a lever handle 34, which is mounted to the sleeve 30 by means of a ratchet arrangement (not shown). The ratchet arrangement causes the handle 34 to engage the sleeve 30 when the handle is turned in one direction, but the handle may be turned freely in the other direction.

A tip portion of each hook 20 is engaged with a correspondingly-shaped protrusion 36 formed on the upright portion of the frame member 12.

The ratchet arrangement of the handle 34 is configured to allow the sleeve 30 to be rotated by the handle in the direction which will draw the rods 28 into the sleeve 30. This then exerts an increased tension on the chains 26 and on the lug 24 of the hook 20. The hook 20 is thereby caused to pivot about the pin 22, so lowering the lug 24 side of the hook 20, and raising the tip portion. The tip portion of the hook thus is urged against the protrusion 36 of the frame 12, which in turn urges the pressure plate 18 downward against the pipe and the elastomeric member arrangement beneath the plate 18.

The symmetrical arrangement of the retaining member 16 ensures that both ends of the member are tightened to the same degree, so reducing the likelihood of uneven application of force to the pipe members In order to release the retaining member 16, the ratchet mechanism may be reversed, allowing the handle to be used to rotate the sleeve 30 in the opposite direction, to release the hooks 20.

Figure 4:
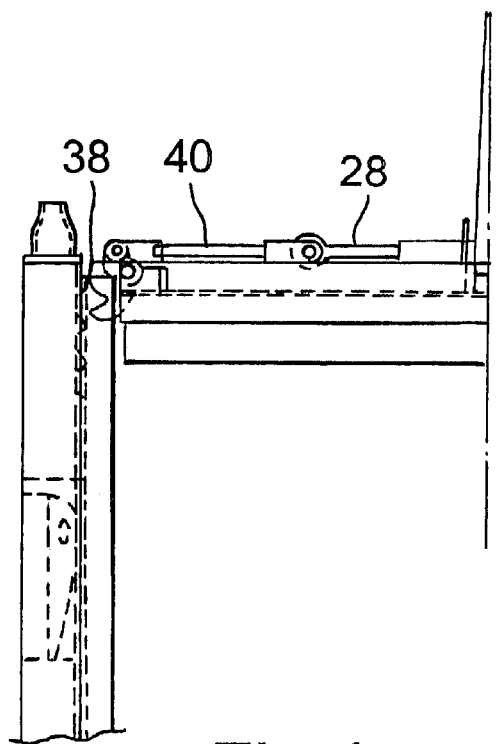
FIGS. 4 and 5 show alternative engaging means and frame portions as may be used with the apparatus of FIG. 1.

Various different arrangements of hooks and frames may be used. For example, FIG. 4 shows one embodiment, with a number of countersunk holes 38 drilled into the frame member, and a hook shaped accordingly. This Figure also shows the rod 28 of the retaining member 16 attached to the hook via a further rigid rod 40, rather than by a chain.

Figure 5:
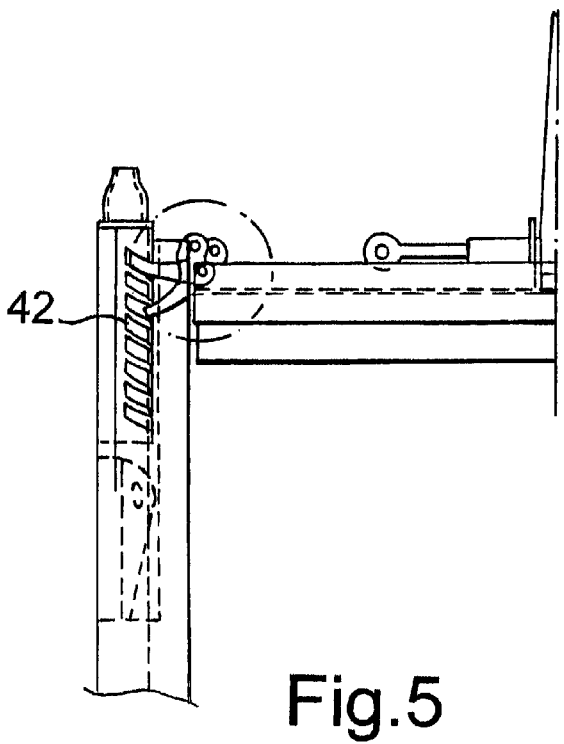

FIG. 5 shows a further alternative hook shape, with elongate recesses 42 formed into the frame member.

Figure 6:
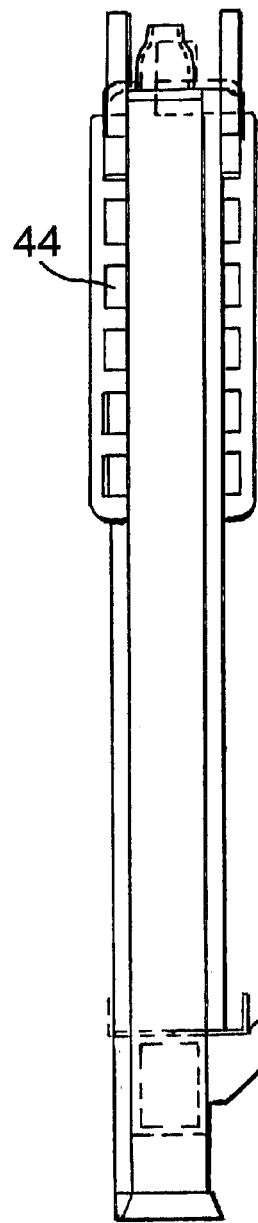
FIG. 6 shows a further alternative frame portion as may be used with the apparatus of FIG. 1.

FIG. 6 shows a frame post with paired cylindrical protrusions 44 provided on either side, to engage with a similarly paired hook member.

Figure 8:
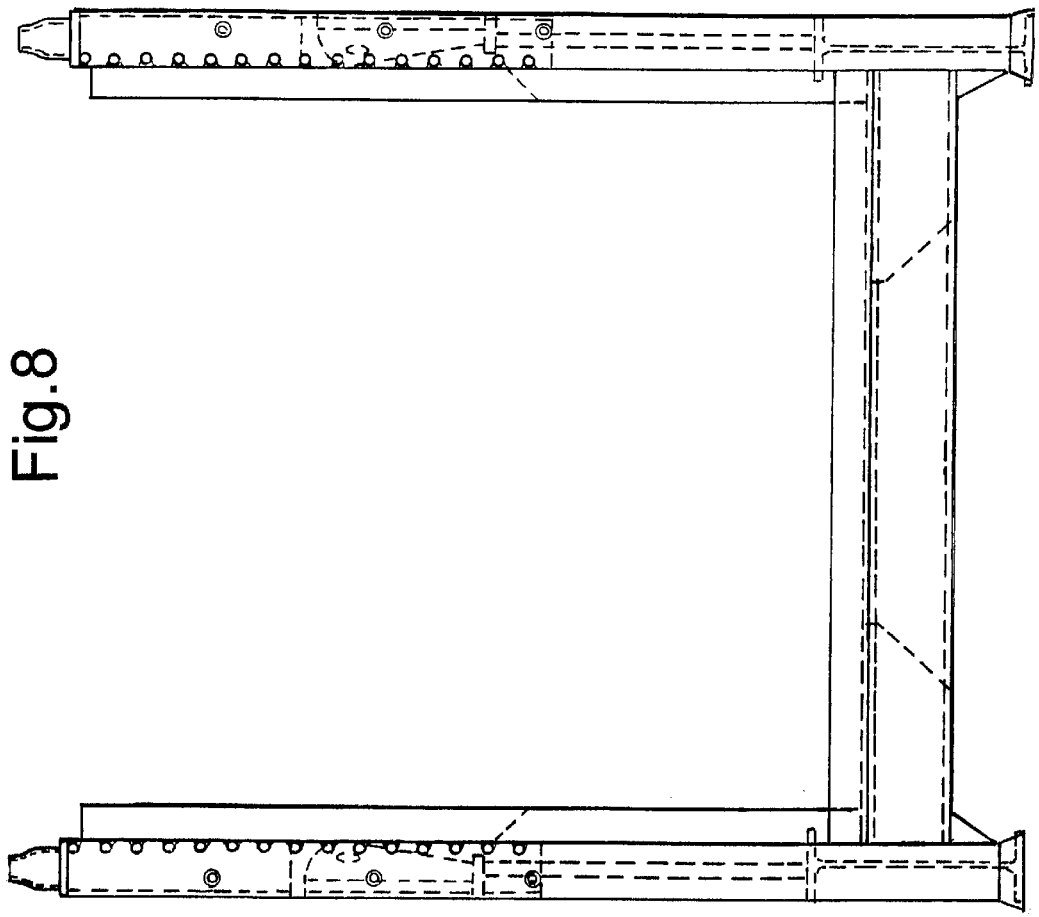
FIGS. 7 and 8 show front and end views of a further frame arrangement as may be used in embodiments of the present invention.
Figure 7:
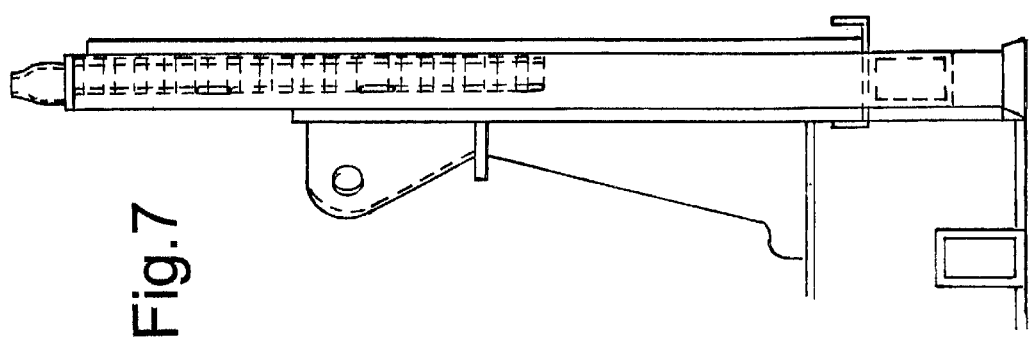

FIGS. 7 and 8 show respectively front and end views of a further frame as may be used in embodiments of the present invention, in which short bars extend between sides of the frame member, and which bars are adapted to be engaged by a suitable hook.

It will be apparent to those of skill in the art that various modifications and alterations may be made to the apparatus described herein. For example, a wide range of hooks or non-hooked members may be provided to urge against the frame; similarly, a variety of engaging portions may be provided on the frame. Further, the threaded rod and sleeve arrangement may instead be replaced with, for example, a winch and chains or the like. The retaining arrangement may also be provided with a quick release mechanism, either to release the tension in the rod and cylinder arrangement (or chain and winch), or to withdraw the hook from the frame, in order to permit rapid removal of the retaining arrangement from the apparatus.

The retaining arrangement described herein may therefore be tightened and released relatively quickly when compared with known retaining mechanisms. Further, aspects of the present invention enable frames to be laid closely to one another while still allowing access to the retaining arrangement to fasten or release the arrangements; known arrangements require a larger spacing between frames to allow access to several separate fastening arrangements. Thus, it can be seen that the present invention provides numerous advantages and improvements over the prior art.

What is claimed is:

1. Apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, the retaining means comprising a pressure plate for urging the elongate members into contact with the packing member, engaging means for engaging a portion of the frame, and an adjustable tension member connected to the engaging means, the engaging means being mounted on a pivot on the pressure plate such that an increase in the tension applied by the tension member causes the engaging means to pivot and be urged against said portion of the frame.

2. The apparatus of claim 1, wherein the pressure plate is provided with two ends, and the engaging means comprises two engagement members located at each end of the pressure plate.

3. The apparatus of claim 2, wherein said tension member defines a common tension member that is connected to both of said engagement members.

4. The apparatus of claim 1, wherein the tension member is selected from one of a chain, wire, cable, bar, rod, and rope.

5. The apparatus of claim 1 wherein the tension member comprises a plurality of members.

6. The apparatus of claim 1 wherein the tension member comprises a member movably received in a sleeve.

7. The apparatus of claim 6, wherein the tension member and the sleeve comprise interacting male and female threads, such that relative rotation of the tension member and sleeve causes relative axial movement of the tension member and the sleeve.

8. The apparatus of claim 7, further comprising a handle for turning one of the sleeve and tension member.

9. The apparatus of claim 8, wherein the handle comprises a ratchet arrangement, such that the handle may only engage to turn the sleeve or the tension member in one direction.

10. The apparatus of claim 9, wherein a release mechanism is provided on the apparatus, to allow turning of the sleeve or the tension member in a direction opposite said one direction, to loosen the tension member.

11. The apparatus of claim 9, wherein said ratchet arrangement may only engage to turn the sleeve or the tension member in one direction.

12. The apparatus of claim 1 further comprising a quick-release mechanism, to rapidly release the tension in the tension member.

13. The apparatus of claim 1, wherein the engaging means is selected from one of a hook, plate, lever, clamp, clasp, lock, and chain.

14. The apparatus of claim 1, wherein the portion of the frame which is engaged is selected from one of a recess, protrusion, stud or boss.

* * * * *